United States Patent [19]

James

[11] 4,231,128
[45] Nov. 4, 1980

[54] COOKING UTENSIL WITH INTEGRALLY FORMED POT ATTACHING MEANS

[76] Inventor: Donald E. James, P.O. Box 64223, Fayetteville, N.C. 28306

[21] Appl. No.: 7,772

[22] Filed: Jan. 29, 1979

[51] Int. Cl.³ .............................................. B25F 1/00
[52] U.S. Cl. ........................................... 7/112; 7/167
[58] Field of Search .......................... 7/110, 112, 167; 16/110 A, 114 B; 30/327

[56] References Cited

U.S. PATENT DOCUMENTS

| | | | |
|---|---|---|---|
| 416,736 | 12/1889 | McPherson | 7/112 |
| 512,162 | 1/1894 | Cuddy | 7/112 |
| 1,177,205 | 3/1916 | Mullin | 16/114 A |

FOREIGN PATENT DOCUMENTS 2803760 11/1978 Fed. Rep. of Germany ............. 30/327
55717 6/1911 Switzerland ................................. 7/112

Primary Examiner—James G. Smith
Attorney, Agent, or Firm—Mills & Coats

[57] ABSTRACT

A cooking utensil or tool basically characterized as having a handle end, a working end, and an intermediate shank portion extending between said handle and working ends. Attaching means is formed about the intermediate shank portion of the cooking tool that enables the cooking tool to be secured or rested in a firm and stationary position about the upper edge of practically all cooking pots and pans known. In addition, an associated wall hanger assembly is provided for supporting a plurality of said cooking utensils in side-by-side relationship when not in use.

10 Claims, 5 Drawing Figures

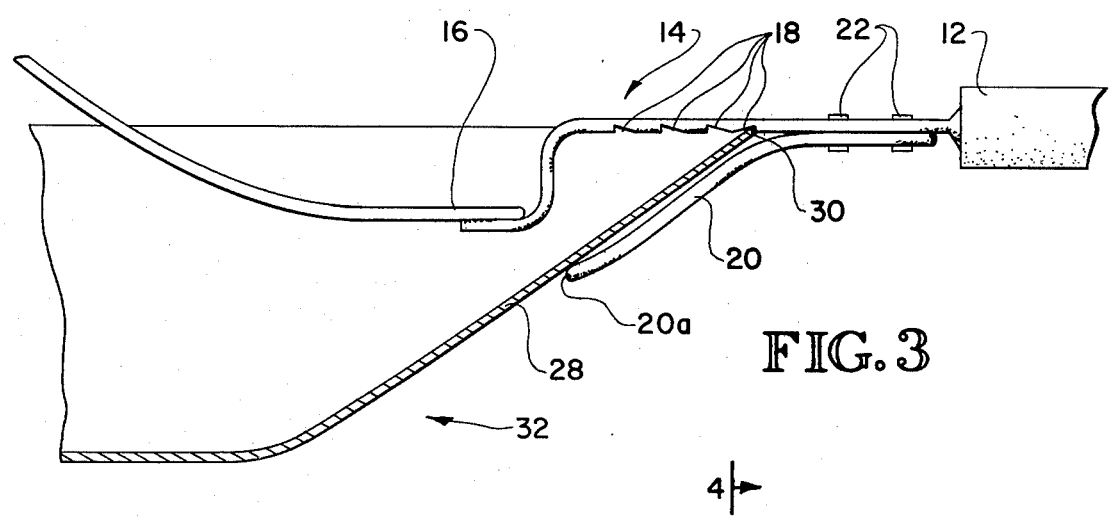
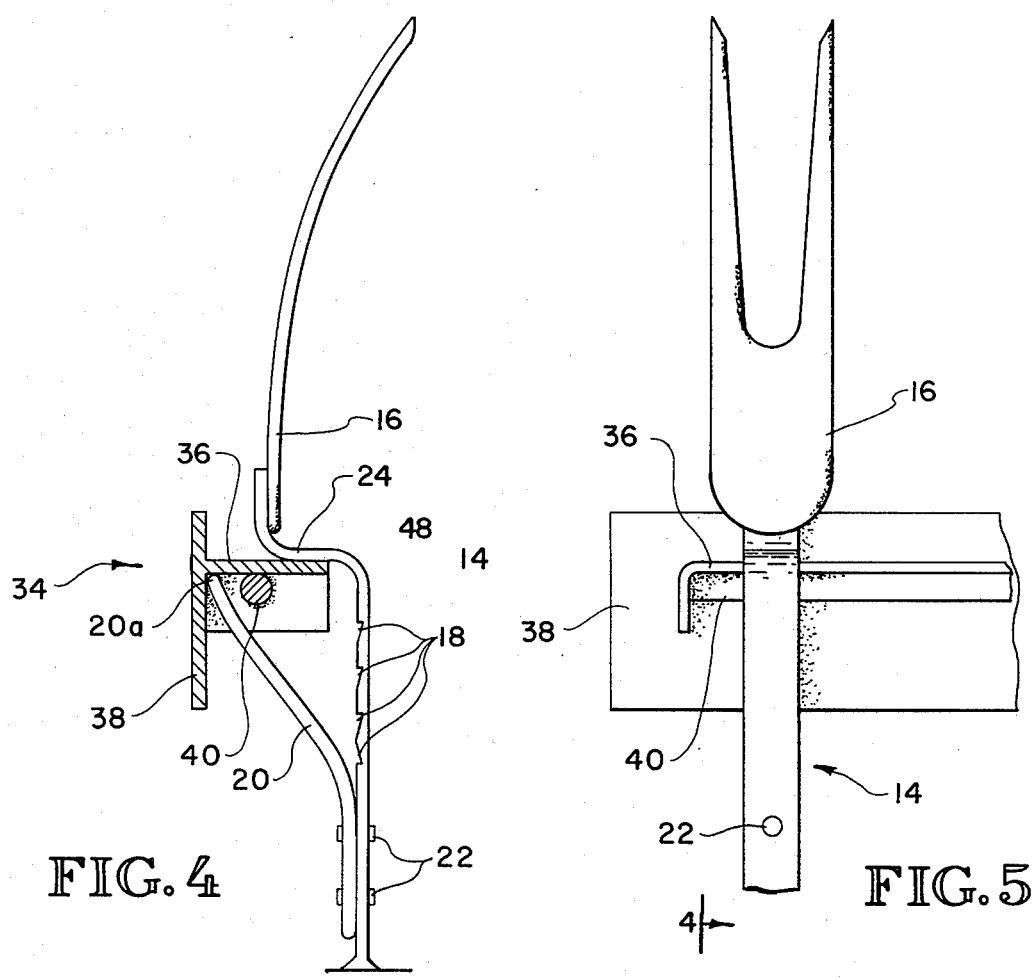

COOKING UTENSIL WITH INTEGRALLY FORMED POT ATTACHING MEANS

The present invention relates to cooking tools and utensils, and more particularly to a cooking tool having means associated therewith for suspending or securing the same about the upper edge of the retaining wall of a pot or pan.

BACKGROUND OF INVENTION

Cooking utensils or tools, such as spoons, spatulas, dippers, meat forks and the like, are very useful in cooking to stir, mix and manipulate food within a pot or pan during the cooking process. In the process of utilizing such utensils, it is common to place the respective cooking utensil in an adjacent plate or drip dish when not being used. Often in transferring the particular utensil from the pot or pan to the drip dish, food and drippings drip from the utensil onto the stove and the surrounding cabinet area. Obviously, this is undesirable because the food and drippings on the stove and the surrounding area must be removed and the area cleaned. In addition, it is troublesome and inconvenient to transfer the particular cooking utensil to and from a drip dish between uses.

Furthermore, it is common to store various cooking utensils such as meat forks, stirring spoons, spatulas, and dippers in utensil drawer. Often it is awkward and inconvenient to gain access to a particular cooking utensil in a cabinet drawer, especially where the utensil is located in an area remote from the stove.

SUMMARY OF INVENTION

The present invention presents a cooking utensil design that enables the cooking utensil to be firmly suspended or secured about the upper edge of a pot or pan's retaining wall such that the working end of the cooking utensil overlies the interior of the pot or pan and the handle end projects outwardly from the retaining wall of the same pot or pan. To accomplish this, the shank portion of the cooking utensil, that is that portion that extends between the working and handle ends, is provided with attaching means that is particularly adapted to accommodate virtually all known pot or pan designs from a conventional right cylindrical wall type pot to a Chinese Wok.

Moreover, provided in association with a cooking utensil of the present invention, is a wall hanger assembly that is particularly adapted to be mounted adjacent a wall or similar surface, and which is adapted to receive and support a plurality of said cooking utensils. The attaching means provided with said cooking utensil is designed to cooperate with the wall hanger assembly such that the respective cooking utensils can be secured thereto in side-by-side relationship in a convenient location relative to the stove.

It is, therefore, an object of the present invention to provide a cooking utensil or tool with attaching means that will enable the cooking utensil to be firmly suspended or secured about the upper edge of a pot or pan's retaining wall.

Still a further object of the present invention is to provide a cooking utensil of the character described above wherein the attaching means is particularly designed to be compatible with ultimately all pots or pans irrespective of the differences in design and configuration of the retaining walls of such pots or pans.

Still a further object of the present invention resides in the provision of a cooking utensil with attaching means for securing the same about the upper edge of a pot or pan's retaining wall so as to clearly maintain the cooking utensil away from the bottom portion of the pot or pan, thereby assuring that substantial heat is not readily transferred to the cooking utensil.

Another object of the present invention is to provide a cooking utensil of the basic character set forth above wherein the attaching means is particularly designed to allow the cooking utensil to be firmly suspended or secured at various angles about the retaining wall of a pot or pan.

It is another object of the present invention to provide a cooking utensil wall hanger for the particular type of cooking utensil disclosed herein, wherein the wall hanger is adapted to receive and support, through the attaching means of said cooking utensil, a plurality of cooking utensils in side-by-side relationship.

A further object of the present invention resides in the provision of a cooking utensil of the basic character referred to above wherein the cooking utensil is relatively simple, inexpensive, but which is sturdy, reliable and functional.

Other objects and advantages of the present invention will become apparent from a study of the following description and the accompanying drawings which are merely illustrative of the present invention.

BRIEF DESCRIPTION OF DRAWINGS

FIG. 3 is a fragmentary side elevational view of a Wok with the same cooking utensil illustrated in FIG. 2 supported about the upper edge of the retaining wall of the Wok.

FIG. 4 is a side elevational view, taken along the lines 4—4 in FIG. 5, of a wall hanger assembly with a cooking utensil supported thereon in accordance with the present invention.

FIG. 5 is a fragmentary side elevational view of the associated wall hanger assembly for receiving and supporting a plurality of said cooking utensils in side-by-side relationship.

DESCRIPTION OF PREFERRED EMBODIMENT

Figure 1:
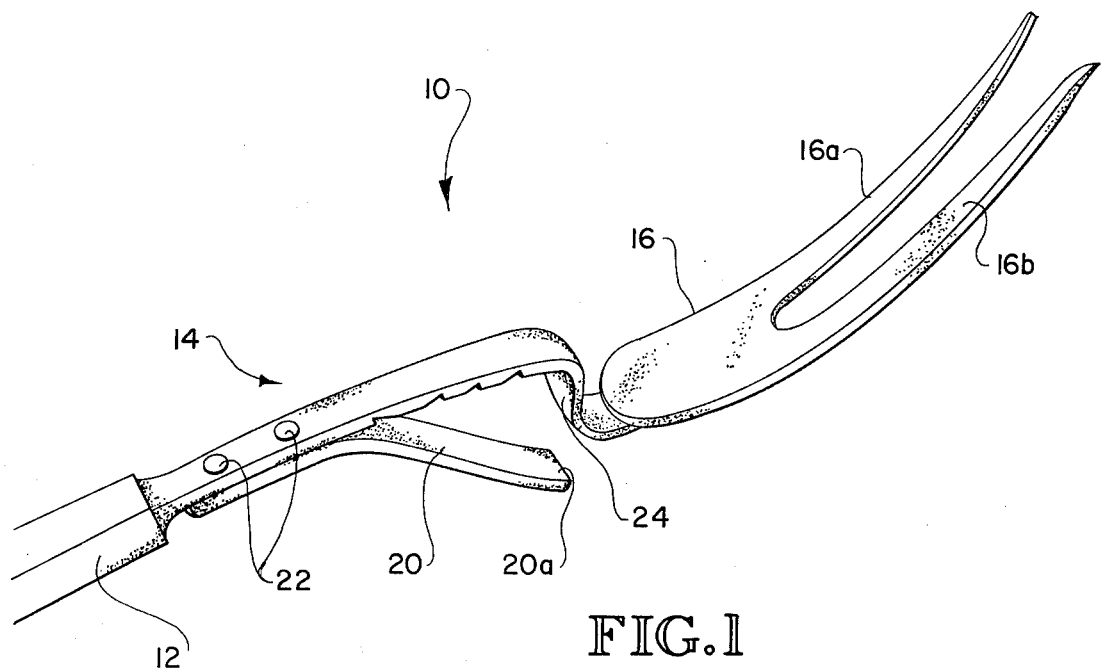
FIG. 1 is a fragmentary perspective view of a cooking utensil having the attaching means of the present invention incorporated therewith.

With further reference to the drawings, the cooking utensil of the present invention is shown therein and indicated generally by the numeral 10. Cooking utensil 10 comprises a handle end 12, and intermediate shank portion indicated generally by the numeral 14, and a working end 16. In the disclosure illustrated herein, the cooking utensil is shown in the form of a meat fork and as such, the working end 16 includes a pair of tongs or tines 16a and 16b that are typically utilized by inserting them within a piece of meat during the cooking process to support or manipulate the same within a pot or pan. It will be understood by those skilled in the art that the cooking utensil 10 of the present invention could be of any of a variety of types such as a spatula, a stirring spoon, a dipper, etc. In such case, the same would still include the handle end 12 and the intermediate shank portion 14, with the basic changes being only about the working end 16 of the utensil.

The cooking utensil 10 of the present invention is particularly designed such that it has the capability to be firmly secured or balanced about the upper edge of a pot or pan during the cooking process. To accomplish this, the cooking utensil 10 of the present invention is provided with attaching means particularly located about the intermediate shank portion 14 of the utensil 10 for attaching the same to the upper edge of the retaining wall of a pot or pan.

The attaching means utilized by the cooking utensil 10 of the present invention includes a series of transverse grooves 18 formed about the underside of the intermediate shank portion 14. In the present disclosure, grooves 18 assume a general saw-tooth pattern with each groove including a perpendicular face and an oblique face with respect to the intermediate shank portion 14.

Viewing grooves 18 in more detail, in the present disclosure, the intermediate shank portion is particularly provided with four such grooves, but it should be understood that the number of grooves could vary according to a particular design and according to what pots or pans it was intended for the cooking utensil 10 to be compatible with. In the disclosure of the preferred embodiment shown herein, it is seen that in the case of the three forwardmost grooves that the perpendicular surface is disposed forwardly of the oblique surface with it being understood that the forward direction would be towards the working end 16 of the cooking utensil 10. The fourth groove, however, being that groove disposed adjacent the handle end 12 is reversed with respect to the three forwardmost grooves in that the perpendicular surface is disposed rearwardly or toward the handle end 12 of the oblique surface. The particular utility of this design is illustrated in FIG. 3 where it shows the upper edge of a Wok, indicated generally by numeral 32, disposed in the rearmost reversed oriented saw-tooth groove 18 for supporting the cooking utensil 10 transversely across the retaining wall 28 of the Wok 32.

Cooperating with the intermediate shank portion 14 and grooves 18, is a holding member 20 that is secured to the underside of the intermediate shank portion 14 by rivets 22 or other suitable means. The holding member 20 extends from the intermediate shank portion 14 towards the working end 16 of the cooking utensil 10 at an angle of approximately 45 degrees and includes a terminal end 20a that terminates in spaced apart relationship with respect to the intermediate shank portion 14.

In addition, forming a portion of the attaching means for the cooking utensil 10, there is provided a downwardly projecting means or back 24 that projects downwardly from the intermediate shank portion 14 forwardly of the grooves 18. In the particular embodiment disclosed, the downwardly projecting means or back 24 is integrally formed as a part of the intermediate shank portion 14.

Therefore, it is seen that the attaching means is defined by the intermediate shank portion 14, grooves 18, holding member 20, and the downwardly projecting back 24, all of which form an open but generally enclosed area with a space being defined between the back 24 and the terminal edge 20a of the holding member. This space, as will be seen from subsequent portions of the disclosure, enables the cooking utensil 10 to be inserted about the upper edge of the retaining wall of the pot or pan in order that the cooking utensil can be firmly rested or secured across the same during the cooking process.

Figure 2:
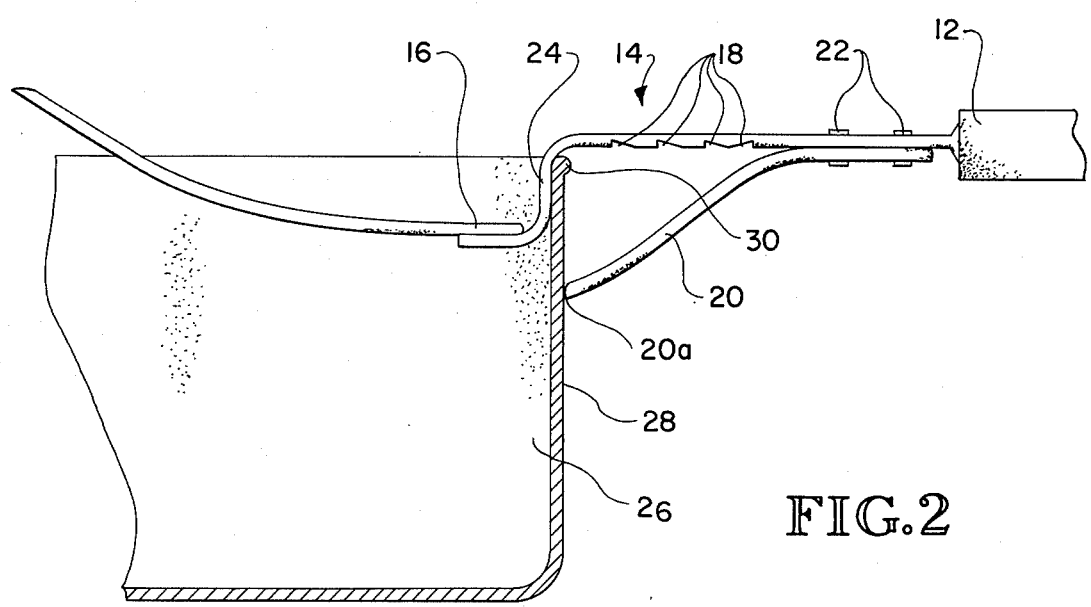
FIG. 2 is a fragmentary side sectional view of a cooking pot with a cooking utensil having the attaching means of the present invention supported about the upper edge of the pot.

With reference to FIG. 2, a conventional cooking pot is shown therein and indicated by the numeral 26, the cooking pot including a generally right cylindrical retaining wall 28 with an upper edge 30 formed about the upper periphery thereof. To attach the cooking utensil 10 about the upper edge 30, as illustrated in FIG. 2, the cooking utensil is inserted over the upper edge 30 at a selected area by placing the utensil over the retaining wall such that the retaining wall 28 extends between back 24 and terminal edge 20a of the holding member 20. In this particular position, the cooking utensil is balanced such that the same would tend to rotate clockwise about the upper edge 30, as viewed in FIG. 2. But the presence of the holding member 20 and particularly terminal edge 20a prevents any such clockwise rotation, and the entire cooking utensil 10 is firmly supported about the upper edge 30 of the retaining wall 28 of the pot 26. As seen in FIG. 2, it is seen that the cooking utensil 10 extends transversely across the retaining wall 28 such that the working end 16 of the utensil 10 generally overlies the interior of the pot 26, while the handle end 12 extends about the exterior of the same pot 26.

In FIG. 3, cooking utensil 10 is shown supported about the upper edge of the retaining wall of a Wok, indicated generally by the numeral 32. In this particular case, it is seen that the upper edge 30 of the Wok engages the rearmost groove 18, while the holding arm 20 generally prevents rotation of the cooking utensil 10 in a clockwise direction, as viewed in FIG. 3. The cooking utensil 10 is particularly balanced such that the center of gravity is generally located to the right of the grooves 18, as viewed in FIG. 3.

For other pots or pans having various designs for the retaining walls thereof, the cooking utensil 10 of the present invention can be firmly rested or secured about the upper edge of the retaining wall by positioning the intermediate shank portion 14 such that the upper edge of the retaining wall engages an appropriate groove 18. In this case, the holding member 20 still acts to prevent clockwise movement of the cooking utensil 10, as viewed in FIGS. 2 and 3.

Turning to FIGS. 4 and 5, there is shown therein a wall hanger assembly, indicated generally by the numeral 34, that is associated with the cooking utensil 10 of the present invention in that it is designed to receive and support the same when not in use. Viewing wall hanger assembly 34 in detail, it is seen that the same includes an elongated ledge 36 that extends from a wall bracket 34 that is adapted to be mounted directly to a wall or other suitable support structure. Extending transversely underneath ledge 36 is a retaining rod or member 40.

In use, a plurality of the cooking utensils 10 of the present invention incorporating the attaching means discussed hereinabove, can be supported in side-by-side relationship across ledge 36. In particular, as illustrated in FIG. 4, the cooking utensil 10 is inserted about the ledge 36 by inserting the ledge within the opening defined by terminal edge 20a and back 24. As illustrated, back 24 rests adjacent the outer upper surface of ledge 36, while terminal edge 20a of the holding member 20 engages the rear underside of ledge 36 in the area where the ledge 36 joins wall bracket 38. Consequently, it is seen that the cooking utensil 10 is supported in a firm secured position about the ledge 36, while the retaining rod 40 assures that the cooking utensil 10 cannot inadvertently slip off the outer terminal edge of the ledge 36.

To remove the cooking utensil 10 from the wall hanger assembly 34, the handle 12 is engaged and generally rotated counterclockwise, as viewed in FIG. 4, until the terminal edge 20a clear the retaining rod 40, and then the entire utensil 10 is slipped from the wall hanger assembly 34.

From the foregoing, it is seen that the present invention presents a cooking utensil or tool with a unique and functional attaching means that allows the same to be firmly positioned about the upper edge of the pot or pan's retaining wall during the cooking process such that the working end of the cooking utensil overlies the interior of the pot or pan. Of important significance is the fact that the attaching means is designed to accommodate all known pot and pan designs, thereby assuring that a cooking utensil or tool utilizing the attaching means of the present invention can be secured about the upper edge of the retaining wall of any known pot or pan.

In addition, forming a part of the present invention is a wall hanger assembly that is adapted to receive and support a plurality of cooking utensils incorporating the attaching means of the present invention, in side-by-side relationship when the cooking utensil is not being used.

The terms "upper," "lower," "forward," "rearward," etc., have been used herein merely for the convenience of the foregoing specification and in the appended claims to describe the cooking utensil and its parts as oriented in the drawings. It is to be understood, however, that these terms are in no way limiting to the invention since the cooking utensil may obviously be disposed in many different positions when in actual use.

The present invention, of course, may be carried out in other specific ways than those herein set forth without departing from the spirit and essential characteristics of the invention. The present embodiments are, therefore, to be considered in all respects as illustrative and not restrictive, and all changes coming within the meaning and equivalency range of the appended claims are intended to be embraced therein.

What is claimed is:

1. A cooking tool provided with means for enabling the same to be secured or rested in a balanced position about the upper edge of the wall structure of a pot or pan, said cooking tool comprising a handle end, a working end and an intermediate shank portion extending between said handle end and said working end; attaching means formed about said intermediate shank portion for enabling said cooking tool to be secured about the upper edge of a pan or pot's retaining wall, said attaching means including at least one transverse groove formed across one side of said intermediate shank portion; a holding member having one end secured to said intermediate shank portion and extending therefrom to where a terminal end thereof terminates in spaced apart relationship with said intermediate shank portion so as to define an open area between the intermediate shank portion of said cooking tool and said holding member; and means projecting downwardly from said intermediate shank portion, forwardly of the at least one transverse groove, towards said terminal end of said holding member wherein said downwardly projecting means, said holding member, and said intermediate shank portion define a receiving area for receiving the upper edge of a pot or pan's retaining wall and wherein said holding member is cooperable with either the at least one groove or said downwardly projecting means to secure said cooking tool about the upper edge of a respective pot or pan's retaining wall.

2. The cooking tool of claim 1 wherein a series of longitudinally spaced transversely extending grooves are formed about the underside of said intermediate shank portion so as to enable the cooking tool to be secured to various types of pots or pans having different retaining wall configurations and designs.

3. The cooking tool of claim 2 wherein said downwardly projecting means is integrally formed with the intermediate shank portion of the cooking tool and forms a part thereof.

4. The cooking tool of claim 3 wherein the plurality of transversely extending grooves form a generally saw-tooth design wherein each of a plurality of the forwardmost grooves, adjacent the working end of the cooking tool, include a perpendicular surface and an oblique surface with the perpendicular surface being disposed forwardly of the oblique surface.

5. The cooking tool of claim 4 wherein the rearmost groove is reversed relative to a plurality of the forwardmost grooves in that the perpendicular surface thereof is disposed rearwardly, towards the handle end of the cooking tool, of the oblique surface.

6. The cooking tool of claim 5 wherein said holding member extends at approximately at a 45-degree angle relative to said intermediate shank portion of said cooking tool.

7. A cooking tool and an associated wall hanger therefor with said cooking tool provided with means for enabling the same to be secured in a balanced position about the upper edge of the wall structure of a pot or pan, said cooking tool comprising a handle end, a working end and an intermediate shank portion for enabling said cooking tool to be secured about the upper edge of a pan or pot's retaining wall, said attaching means including at least one transverse groove formed across one side of said intermediate shank portion; a holding member having one end secured to said intermediate shank portion and extending therefrom to where a terminal end thereof terminates in spaced apart relationship with said intermediate shank portion so as to define an open area between the intermediate shank portion of said cooking tool and said holding member; and means projecting downwardly from said intermediate shank portion, forwardly of the at least one transverse groove, towards said terminal end of said holding member wherein said downwardly projecting means, said holding member, and said intermediate shank portion define a receiving area for receiving the upper edge of a pot or pan's retaining wall and wherein said holding member is cooperable with either the at least one groove or said downwardly projecting means to secure said cooking tool about the upper edge of a respective pot or pan's retaining wall; and said wall hanger comprising ledge means for projecting between the terminal end of said holding member and said downwardly projecting means and into the open area defined by said intermediate shank portion, said holding member, and said downwardly projecting means, whereby said cooking tool may be supported about said wall hanger such that said upper outer portion of said ledge means engages said downwardly projecting means of said cooking tool while the terminal end of said holding member engages the lower surface of said ledge means.

8. The cooking tool and associated wall hanger of claim 7 wherein said wall hanger further includes an elongated retaining means running substantially the entire width of said ledge means and disposed about the underside of said ledge means.

9. The cooking tool and associated wall hanger of claim 8 wherein said wall hanger further includes a mounting back that is secured generally perpendicular to said ledge means which is adapted to lie adjacent a wall in order that the same can be mounted or hung directly adjacent thereto.

10. The cooking tool of claim 9 wherein said working end includes a plurality of tong extending therefrom.

* * * * *